United States Patent
Kanagawa et al.

(10) Patent No.: US 6,577,832 B2
(45) Date of Patent: Jun. 10, 2003

(54) APPARATUS FOR FORMING IMAGE INCLUDING ROTATIONAL MEMBER USING ELECTROCONDUCTIVE ROLLING BEARING

(75) Inventors: Takashi Kanagawa, Minamiashigara (JP); Kazuyuki Mizomichi, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 10/005,149

(22) Filed: Dec. 7, 2001

(65) Prior Publication Data

US 2002/0197080 A1 Dec. 26, 2002

(30) Foreign Application Priority Data

Mar. 22, 2001 (JP) ........................................ 2001-083367

(51) Int. Cl.[7] .............................................. G03G 15/00
(52) U.S. Cl. ..................................................... 399/117
(58) Field of Search ................................. 399/107, 111, 399/117, 119, 262; 198/672; 384/46, 51, 58, 91, 107, 322, 907

(56) References Cited

U.S. PATENT DOCUMENTS 5,442,423 A * 8/1995 Edmunds et al. ............ 399/262
5,612,771 A * 3/1997 Yamamoto et al. .......... 399/301

* cited by examiner

Primary Examiner—Hoan Tran
(74) Attorney, Agent, or Firm—Oliff & Berridge, PLC

(57) ABSTRACT

An apparatus for forming an image is provided, in which a rotational member, such as a photoreceptor drum, is borne by using a rolling bearing assuring electric conduction between an inner ring and an outer ring by filling electroconductive grease. Rotation of a photoreceptor drum is borne by using a electroconductive rolling bearing having a resistance between the inner ring and the outer ring of about 15 k$\Omega$ or less in terms of a maximum value and about 8 k$\Omega$ or less in terms of an effective value under a dynamic condition, where a radial or thrust load acting between the inner ring and the outer ring is 10 N, and a relative difference in rotational velocity between the inner ring and the outer ring is 150 rpm, and the photoreceptor drum is rotated at about 75 rpm or more.

2 Claims, 2 Drawing Sheets

APPARATUS FOR FORMING IMAGE INCLUDING ROTATIONAL MEMBER USING ELECTROCONDUCTIVE ROLLING BEARING

BACKGROUND OF THE INVENTION

1. Field of the Invention

The present invention relates to an apparatus for forming an image, such as an electrophotographic duplicator and a facsimile machine, and in particular, it relates to an improvement of an apparatus for forming an image, in which rotation of rotational members including an electrostatic latent image carrying member and other rotational members is borne by an electroconductive rolling bearing.

2. Description of Related Art

An apparatus for forming an image, such as an electrophotographic duplicator and a laser beam printer, contains various kinds of rotational members, such as a photoreceptor drum, a transferring roll, a magnet roll of a developing device, a heating roll of a fixing device and a transporting roll for a recording sheet or an original copy, and the rotational members are borne by a fixed member, such as a frame of the apparatus, through rolling bearings. In an electrophotographic process, a photoreceptor drum is uniformly charged, and then the charge is relieved only in the exposed part to form an electrostatic latent image. Therefore, the photoreceptor drum is necessarily grounded. In order to develop the electrostatic latent image formed on the photoreceptor drum, a developing bias is necessarily applied to the magnetic roll, and in order to transfer a toner image from the photoreceptor drum to the recording sheet, a transferring bias is necessarily applied to the transferring roll. Furthermore, the heating roll and the transporting roll for a recording sheet are sometimes charged due to the charge carried by the recording sheet, and when a discharge phenomenon due to the charge occurs, malfunction and unnecessary noise caused by radiated electric waves occur. In order to prevent the problems, the rolls are necessarily grounded. As a method for grounding the various kinds of rotational members or connecting them to a bias electric power source, such a method has been know that a spring is made in contact under sliding with one end or both ends of the rotational member, whereby connection and grounding of the various kinds of rotational members are attained.

However, because the slide-contact between the spring and the rotational member brings about time-lapse deterioration, such as wear and alteration, fluctuation of the resistance between the spring and the rotational member is unavoidable, and therefore not only the initial performance cannot be maintained with the lapse of time, but also there is a possibility that grounding or connecting failure and abnormal noise occur.

An electroconductive bearing has been known that assures electric conduction between an inner ring and an outer ring without provision of any particular slide-contacting member. When the rotation of the rotational member is borne by using the electroconductive bearing, the rotational member can be grounded or applied with a high bias voltage without providing a spring. The electroconductive bearing contains an outer ring fixed to a fixed member, such as a frame of an apparatus, an inner ring fixed to a rotational axis, and rolling elements, such as balls and rollers, rolling between the outer ring and the inner ring under receiving a load, in which the inner and outer rings and the rolling elements are formed with an electroconductive metal, such as steel. Grease filled between the inner ring and the outer ring is also imparted with electroconductivity, and even when an oil film is formed between the rolling elements and the inner ring or between the rolling elements and the outer ring, electric conduction can be assured.

However, in the case where a rotational member, such as a photoreceptor drum, is grounded by using the conventional electroconductive bearing, another problem arises that unallowable radiation noise occurs at the electroconductive bearing, although the function of grounding the rotational member is exerted without any problem. An electronic office equipment, such as an electrophotographic duplicator and a facsimile machine, sometimes generate jamming (radiation noise) over wide frequency bands to cause disturbance in receivers, such as radios and televisions. In order to prevent the electric wave disturbance, a self-imposed standard has been determined by the manufacturer of the equipment in Japan. However, in the case where the conventional electroconductive bearing is used, the radiation noise generated by the bearing cannot be controlled within the range of the self-imposed standard. As a reason of the generation of radiation noise, it is considered that a slight gap is formed between the inner ring or the outer ring and the rolling elements during rotation of the rotational member, and electric leakage occurs at the gap.

SUMMARY OF THE INVENTION

The invention has been made in view of the problems associated with the conventional art and provides an apparatus for forming an image, in which a rotational member, such as a photoreceptor drum, is borne by using a rolling bearing assuring electric conduction between an inner ring and an outer ring by filling electroconductive grease, and generation of radiation noise from a rotational part using the bearing due to leakage can be effectively suppressed even when the rotational member is grounded without any other slide-contact member, such as an grounding spring.

The invention relates to, as one aspect, an apparatus for forming an image containing an electrostatic latent image carrying member and an electroconductive rolling bearing that bears rotation of the electrostatic latent image carrying member; the electroconductive rolling bearing containing an outer ring and an inner ring, which are fixed to a pair of members relatively rotating, respectively, plural rolling elements rolling between the inner ring and the outer ring under receiving a load, and a lubricant filled between the outer ring and the inner ring that contains an electroconductive substance dispersed therein; a resistance between the inner ring and the outer ring being about 15 k$\Omega$ or less in terms of a maximum value and about 8 k$\Omega$ or less in terms of an effective value under a dynamic condition, where a radial or thrust load acting between the inner ring and the outer ring is 10 N, and a relative difference in rotational velocity between the inner ring and the outer ring is 150 rpm; and the electroconductive rolling bearing being used at a relative difference in rotational velocity between the inner ring and the outer ring of about 75 rpm or more.

It is preferred that the resistance between the inner ring and the outer ring is 11 k$\Omega$ or less in terms of a maximum value and 3 k$\Omega$ or less in terms of an effective value under the dynamic condition.

As confirmed by the inventors, when such a rolling bearing that is suppressed in resistance between the inner ring and the outer ring under the certain condition is used, the radiation noise generated from the bearing can be suppressed to such a level that causes no problem from the standpoint of the self-imposed standard of VCCI and of the standard of FCC.

The reason why the dynamic condition for measuring the resistance is determined by the load and the relative difference in rotational velocity is as follows. In the case where a load applied on the rolling bearing is too large, an oil film is broken to make the three members, the inner ring, the rolling elements and the outer ring, each made of an electroconductive metal, in contact each other. In such a case, the electric conduction among the three members can be assured to such an extent that the radiation noise causes no problem. The resistance between the inner and outer rings of the rolling bearing having electroconductive grease filled therein tends to be increased when the relative difference in rotational velocity between the inner ring and the outer ring. In view of the circumstances, the dynamic condition for measuring the resistance is determined as a radial or thrust load acting between the inner ring and the outer ring of 10 N and a relative difference in rotational velocity between the inner ring and the outer ring of 150 rpm. Furthermore, because the radiation noise is liable to occur when the rotation number is increased, the electroconductive rolling bearing is preferably used at a rotation number of about 75 rpm or more, and more preferably 100 rpm or more. In the case where the rotation number is low, the conventional grounding method can be employed since noise is difficult to occur. When the electroconductive rolling bearings are used in two or more sites in the apparatus, the number of parts constituting the apparatus itself can be reduced, and miniaturization of the apparatus can be realized.

BRIEF DESCRIPTION OF THE DRAWINGS

Preferred embodiments of the invention will be described in detail based on the following figures, wherein.

DESCRIPTION OF THE PREFERRED EMBODIMENTS

The invention will be described in more detail with reference to the attached drawings.

Figure 1:
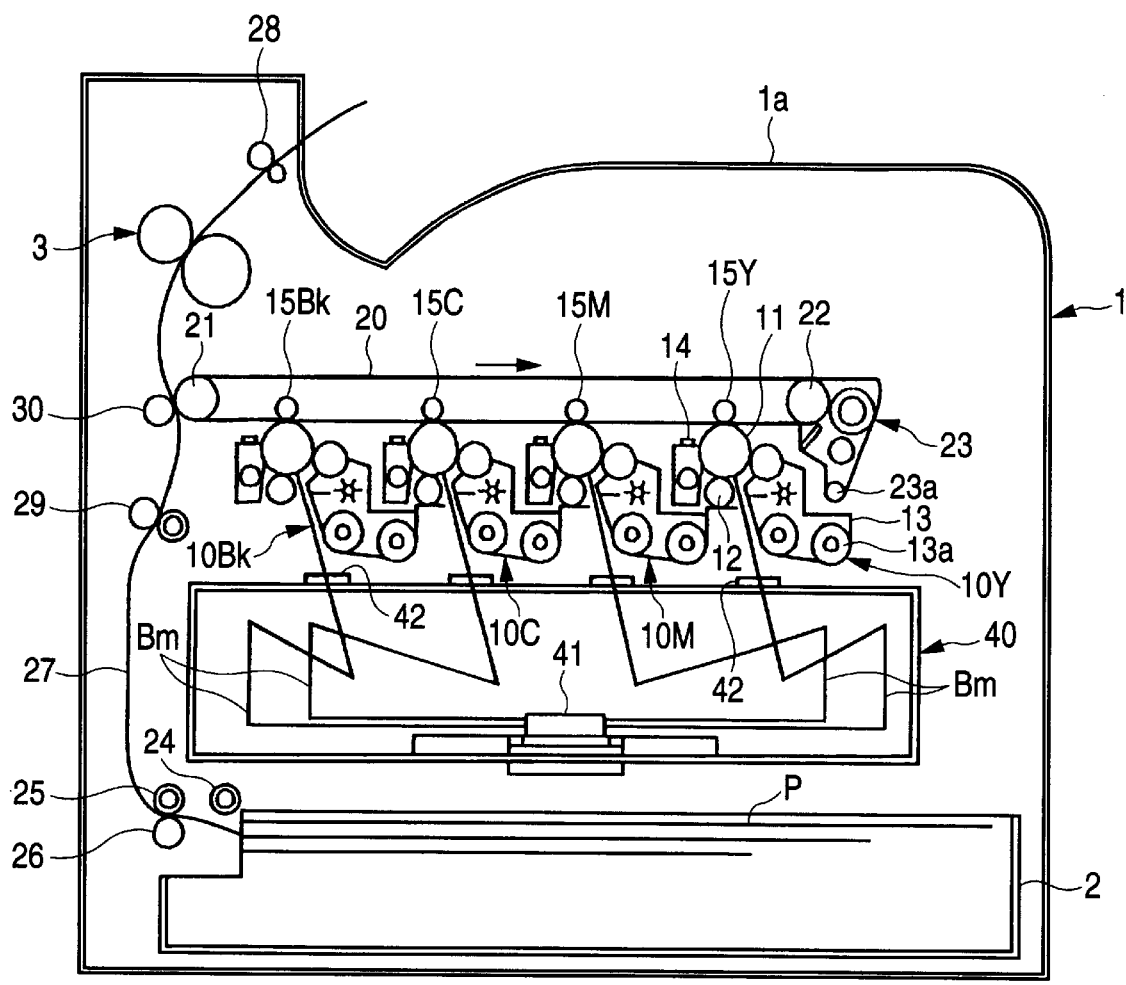
FIG. 1 is a schematic diagram showing a constitution of a laser beam printer using an electroconductive rolling bearing according to the invention for bearing rotation of a photoreceptor drum.

FIG. 1 is a schematic diagram showing a tandem type color laser beam printer using the electroconductive rolling bearing according to the invention for bearing a photoreceptor drum. The laser beam printer has four image-forming engines 10Y, 10M, 10C and 10Bk for forming toner images of four colors, yellow, magenta, cyan and black, respectively, and an intermediate transfer belt (IBT) 20, on which toner images are primarily transferred from the image-forming engines, and the toner images formed on the intermediate transfer belt 20 by multiple transfer is then secondarily transferred to a recording sheet P, so as to form a full color image.

The intermediate transfer belt 20 is formed to have an endless form and is hanged on a pair of belt transporting rollers 21 and 22, so as to receive the primary transfer of the toner images formed by the image-forming engines 10Y, 10M, 10C and 10Bk of the respective colors through rotating in the direction shown by the arrow. A secondary transferring roller 30 is arranged at a position opposite to one of the belt transporting roller 21 with respect to the intermediate transfer belt 20 intervening between them, and the recording sheet P is passed between the transferring roller 30 and the intermediate transfer belt 20, which are in contact with each other under pressure, so as to receive the secondary transfer of the toner images from the intermediate transfer belt 20. In other words, the belt transporting roller 21 functions as a backup roller of the transferring roller 30. On the other hand, at a position opposite to the other belt transporting roller 22, a belt cleaner 23 for the intermediate transfer belt 20 is arranged to remove the toner remaining and attached to the intermediate transfer belt 20 after the secondary transfer. The residual toner removed by the belt cleaner 23 is transported as a waste toner to the front side (the near side of the page plane in FIG. 1) with an auger 23a and is dropped in a recovery box described later.

The four image-forming engines 10Y, 10M, 10C and 10Bk are arranged in parallel under the intermediate transfer belt 20, and toner images formed corresponding to image information of the respective colors are primarily transferred to the intermediate transfer belt 20. The four image-forming engines are arranged in the order of yellow 10Y, magenta 10M, cyan 10C and black 10Bk along the rotational direction of the intermediate transfer belt 20, and the black image-forming engine 10Bk, which is expected to be used most frequently, is arranged at the nearest position to the secondary transfer position. Under the image-forming engines 10Y, 10M, 10C and 10Bk, a raster scanning unit 40 is arranged to expose photoreceptor drums 11 installed in the respective image-forming engine corresponding to the image information. The raster scanning unit 40, which is common to all the image-forming engines 10Y, 10M, 10C and 10Bk, contains four semiconductor lasers (not shown in the figure) emitting laser beams Bm modulated with the image information of the respective colors, and one polygonal mirror 41 rotating at high speed for scanning the four laser beams Bm along the axial direction of the photoreceptor drums 11. The laser beams Bm scanned by the polygonal mirror 41 are reflected by mirrors (not shown in the figure) to proceed along the prescribed paths, and then expose the photoreceptor drums 11 of the image-forming engines 10Y, 10M, 10C and 10Bk through scanning windows 42 provided in an upper part of the raster scanning unit 40.

The image-forming engines 10Y, 10M, 10C and 10Bk each contains the photoreceptor drum 11, a charging roller 12 for charging the photoreceptor drum 11 to a uniform background potential, a developing device 13 for developing an electrostatic latent image formed on the photoreceptor drum 11 by exposure with the laser beam Bm, so as to form a toner image, and a drum cleaner 14 for removing a residual toner and paper powder from the surface of the photoreceptor drum 11 after transferring the toner image to the intermediate transfer belt 20, and toner images corresponding to the image information of the respective colors are formed on the photoreceptor drums 11.

Primary transferring rollers 15Y, 15M, 15C and 15Bk are arranged at positions opposite to the photoreceptor drums 11 of the image-forming engines 10Y, 10M, 10C and 10Bk with respect to the intermediate transfer belt 20 intervening between them. A prescribed bias voltage is applied to the transferring rollers 15Y, 15M, 15C and 15Bk to form electric fields between the photoreceptor drums 11 and the transferring rollers 15Y, 15M, 15C and 15Bk, and thus the toner images electrically charged on the photoreceptor drums 11 are transferred to the intermediate transfer belt 20 through the coulomb force.

The recording sheet P is fed from a paper feeding cassette 2 contained in a lower part of the printer chassis 1 to the interior of the printer, specifically to the secondary transfer position, at which the intermediate transfer belt 20 and the secondary transferring roller 30 are in contact with each other. The paper feeding cassette 2 is set by sliding down into the lower part of the printer chassis 1 from the front side of the printer chassis, and a pickup roller 24 and a paper feeding roller 25 are arranged in parallel in an upper part of the paper feeding cassette 2 set in the printer chassis, so as to withdraw the recording sheet P contained in the cassette 2. A retarding roller 26 is arranged at a position opposite to the paper feeding roller 25 to prevent duplicate feeding of the recording sheet P.

A transporting path 27 of the recording sheet P inside the printer is arranged in a substantially vertical direction along the left side wall of the printer chassis 1. The recording sheet P withdrawn from the paper feeding cassette 2 positioned in the bottom part of the printer chassis 1 is raised along the sheet transporting path 27, and after receiving transfer of the toner image at the secondary transfer position, the recording sheet P is then sent to a fixing device 3 arranged immediately above the secondary transfer position. The recording sheet P having the toner image fixed thereto by the fixing device 13 is ejected through a ejecting roller 28 to a paper delivery tray 1a arranged on an upper part of the printer chassis 1 in a face down state. In FIG. 1, numeral 29 denotes a registration roller for controlling the entrance timing of the recording sheet P into the secondary transfer position.

Upon forming a full color image by the color laser beam printer thus configured, the raster scanning unit 40 scans the photoreceptor drums 11 of the respective image-forming engines 10Y, 10M, 10C and 10Bk at a prescribed timing corresponding to the image information of the respective colors, whereby toner images corresponding to the image information are formed on the photoreceptor drums 11 of the image-forming engines 10Y, 10M, 10C and 10Bk. The toner images formed in the image-forming engines 10Y, 10M, 10C and 10Bk are transferred one by one to the rotating intermediate transfer belt 20, and a multiplied toner image formed by accumulating the toner images of the respective colors is produced on the intermediate transfer belt 20. The recording sheet P is dispatched at a prescribed timing from the paper feeding cassette 2 and is then passed between the secondary transferring roller 30 and the intermediate transfer belt 20 weighing the timing when the toner image primarily transferred to the intermediate transfer belt 20 reaches the secondary transfer position. Consequently, the multiplied toner image on the intermediate transfer belt 20 is secondarily transferred to the recording sheet P. The recording sheet P having been subjected to the secondary transfer is fixed for the toner image by the fixing device 3, whereby the full color image is completed on the recording sheet P.

In the laser beam printer, the electroconductive rolling bearings according to the invention are used for bearing the photoreceptors 11 of the image-forming engines, and for bearing the belt transporting rollers 21 and 22, on which the intermediate transfer belt 20 is hanged, and ground the photoreceptor drums 11 and the belt transporting roller 22, respectively. The electroconductive rolling bearings also connects the belt transporting roller 21 to a high bias voltage.

The inventors investigate two kinds of electroconductive rolling bearings (Example and Comparative Example) as to whether or not radiation noise due to leakage is generated upon using the bearings under various using conditions. The two kinds of electroconductive rolling bearings each is a single line deep groove ball bearing having a bearing outer diameter of 42 mm, a width of 7 mm and a bearing inner diameter of 30 mm, but only the species of electroconductive grease filled between the inner ring and the outer ring are different from each other.

The composition of the electroconductive grease filled in the rolling bearing of the Example is as follows:

| | |
|---|---|
| Base oil for lubricating oil | 80% |
| Thickening agent | 18% |
| (carbon black, average particle diameter: 60 nm) | |
| Additive for lubricating oil (lithium soap) | 2% |

On the other hand, conventional electroconductive grease produced by Kyodo Yushi Co., Ltd. is filled in the rolling bearing of the Comparative Example.

Figure 2:
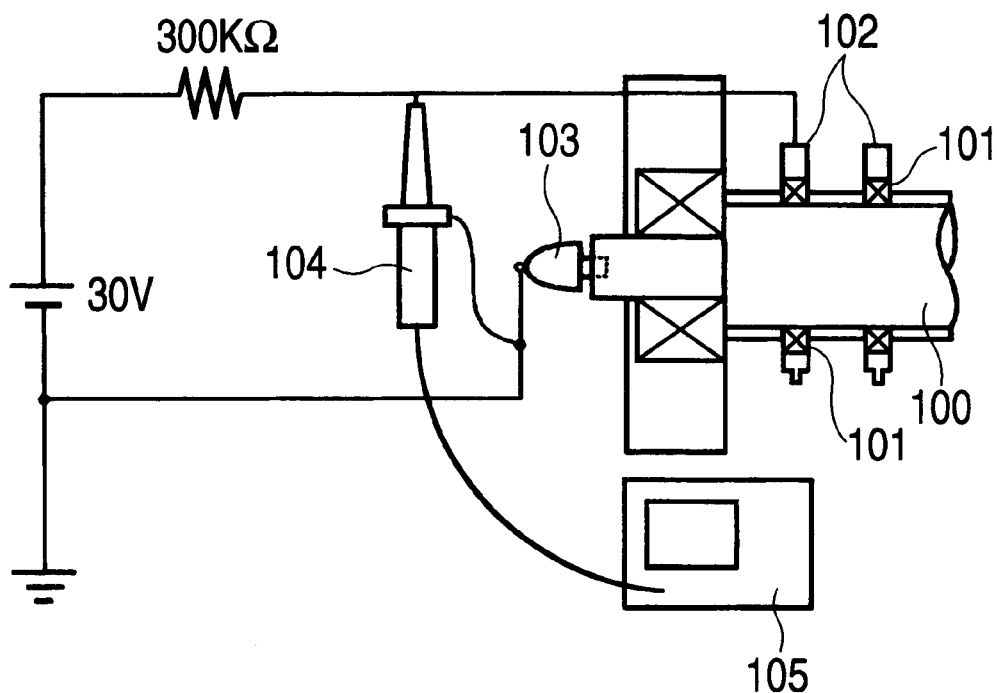
FIG. 2 is a schematic diagram showing an experimental apparatus for measuring a resistance of an electroconductive rolling bearing.

The inventors firstly carry out an experiment for measuring resistances of the rolling bearings of the Example and the Comparative Example. The experiment is carried out in such a manner as shown in FIG. 2 that the inner ring of the rolling bearing 101 as a sample is assembled on a rotational axis 100 capable of being rotated at a prescribed speed, whereas the outer ring of the rolling bearing 101 is assembled on a fixed housing 102, and a resistance of 300 kΩ and a constant voltage power source of 30 V are connected in series to a line withdrawn from the outer ring. A line connected to the rotational axis 100 is grounded with a slip ring 103. A voltage occurring between the outer ring of the rolling bearing 101 as a sample and the rotational axis 100 is input through a probe 104 of an attenuation ratio of 10/1 into a digital oscilloscope 105, and the voltage is measured by using the digital oscilloscope 105. The measurement is carried out while the rotation rate of the rotational axis 100 is changed to 70 rpm and 150 rpm, and the maximum voltage $V_{max}$ and the effective voltage $V_{eff}$ are measured for the respective rotation rates. The measurement is also carried out while a radial load of 10 N is applied to the rolling bearing 101. The effective voltage $V_{eff}$ is such a voltage that is defined by the following equation.

$$\text{Effective voltage } V_{eff} = \sqrt{((\text{momentary voltage})^2 / \text{measurement time})}$$

Figure 3:
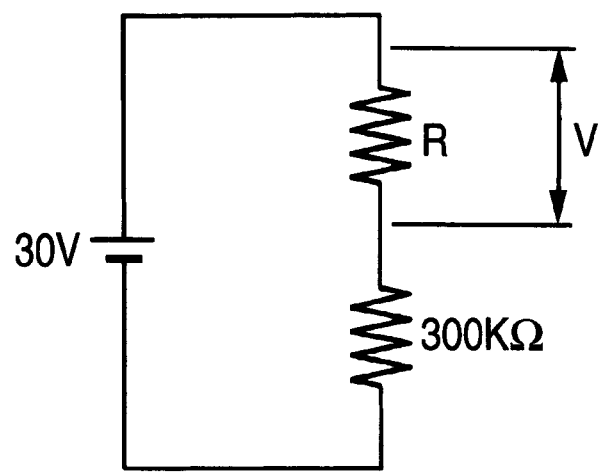
FIG. 3 is a circuit diagram of the experimental apparatus shown in FIG. 2.

The experimental apparatus shown in FIG. 2 has an equivalent circuit shown in FIG. 3, and thus the voltage V in FIG. 3 is measured by the oscilloscope. Therefore, the maximum value $R_{max}$ and the effective value $R_{eff}$ of the resistance of the rolling bearing are calculated by the following equations by using the maximum voltage $V_{max}$ and the effective voltage $V_{eff}$ thus obtained.

$$\text{Maximum value of resistance } R_{max} = 300 \ (k\Omega) \times V_{max}/(30 - V_{max})$$

$$\text{Effective value of resistance } R_{eff} = 300 \ (k\Omega) \times V_{eff}/(30 - V_{eff})$$

The photoreceptor drums are borne by the rolling bearings of the Example and the Comparative Example on the apparatus frame of the laser beam printer. An alternating electric current of 1 mA and a direct electric current of −700 V are applied to the photoreceptor drums, whereas the apparatus frame is grounded, and it is measured as to whether or not leakage noise actually occurs from the rolling bearing by using a spectrum analyzer (produced by Hewlett-Packard Company). At this time, no slide-contacting member, such as an earthing spring, is provided for the photoreceptor drums. The measurement is carried out in an electric wave laboratory. The results are shown in Table 1 below along with the measured voltages and the calculated resistances.

TABLE 1

| | Rotation number (rpm) | Measured voltage | | Calculated resistance | | State of occurrence of leakage noise |
|---|---|---|---|---|---|---|
| | | $V_{max}$ (V) | $V_{eff}$ (mV) | $R_{max}$ (kΩ) | $R_{eff}$ (kΩ) | |
| Example | 70 | 0.68 | 23 | 6.96 | 0.23 | no leakage noise occurring |
| | 150 | 1.04 | 223 | 10.77 | 2.25 | no leakage noise occurring |
| Comparative Example | 70 | 14.50 | 1,290 | 280 | 13.48 | radiation noise occurring at from 30 MHz to over 300 MHz |
| | 150 | 28.30 | 7,290 | 5,000 | 96.30 | leakage noise occurring |

As shown in Table 1, in the case where the rolling bearing of the Comparative Example is used, radiation noise due to leakage occurs at both rotation numbers of 70 rpm and 150 rpm. On the other hand, in the case where the rolling bearing of the Example is used, occurrence of radiation noise due to leakage is not observed. In the case where the apparatus using the rolling bearing of the Example is used as an apparatus for forming an image, when image formation is carried out by rotating the bearings of the photoreceptor drums at 123.5 rpm, occurrence of radiation noise due to leakage is not found, and full color images of good conditions can be obtained at high speed over a large number of sheets without formation of abnormal noise and malfunction.

As described in the foregoing, according to the apparatus for forming an image of the invention, the resistance is suppressed to a prescribed value or less by filling electroconductive grease. In an apparatus for forming an image constituted by bearing rotational members, such as a photoreceptor drum, by using the rolling bearings, leakage noise occurring from the rolling bearings can be avoided to suppress the radiation noise to such a level that causes no problem from the standpoint of the self-imposed standard, even when the rotational members are grounded using no slide-contacting member, such as an earthing spring. Furthermore, the apparatus for forming an image can be further miniaturized by using the bearings for two or more of the rotational members.

The entire disclosure of Japanese Patent Application No. 2001-083367 filed on Mar. 22, 2001 including specification, claims, drawings and abstract is incorporated herein by reference in its entirety.

What is claimed is:

1. An apparatus for forming an image comprising an electrostatic latent image carrying member and an electroconductive rolling bearing that bears rotation of the electrostatic latent image carrying member;

the electroconductive rolling bearing comprising an outer ring and an inner ring, which are fixed to a pair of members relatively rotating, respectively, plural rolling elements rolling between the inner ring and the outer ring under receiving a load, and a lubricant filled between the outer ring and the inner ring that contains an electroconductive substance dispersed therein;

a resistance between the inner ring and the outer ring being about 15 kΩ or less in terms of a maximum value and about 8 kΩ or less in terms of an effective value under a dynamic condition, where a radial or thrust load acting between the inner ring and the outer ring is 10 N, and a relative difference in rotational velocity between the inner ring and the outer ring is 150 rpm; and the electroconductive rolling bearing being used at a relative difference in rotational velocity between the inner ring and the outer ring of about 75 rpm or more.

2. An apparatus for forming an image comprising an electrostatic latent image carrying member, plural rotation members and an electroconductive rolling bearing that bears rotation of the electrostatic latent image carrying member and at least one of the rotation members;

the electroconductive rolling bearing comprising an outer ring and an inner ring, which are fixed to a pair of members relatively rotating, respectively, plural rolling elements rolling between the inner ring and the outer ring under receiving a load, and a lubricant filled between the outer ring and the inner ring that contains an electroconductive substance dispersed therein; and a resistance between the inner ring and the outer ring being about 15 kΩ or less in terms of a maximum value and about 8 kΩ or less in terms of an effective value under a dynamic condition, where a radial or thrust load acting between the inner ring and the outer ring is 10 N, and a relative difference in rotational velocity between the inner ring and the outer ring is 150 rpm.

* * * * *